US006958885B1

(12) United States Patent
Chen et al.

(10) Patent No.: US 6,958,885 B1
(45) Date of Patent: Oct. 25, 2005

(54) INSULATION LAYER STRUCTURE FOR INDUCTIVE WRITE HEADS AND METHOD OF FABRICATION

(75) Inventors: Yingjian Chen, Fremont, CA (US); Kyusik Sin, Pleasanton, CA (US); Ronald Barr, Mountain View, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 244 days.

(21) Appl. No.: 09/745,708

(22) Filed: Dec. 21, 2000

(51) Int. Cl.[7] .......................... G11B 5/147; G11B 5/127
(52) U.S. Cl. .................... 360/126; 29/603.07; 360/125
(58) Field of Search ............................... 360/126, 125, 360/318.1, 97.01, 119, 127; 29/603.13, 603.14, 29/603.15, 603.07, 603.08

(56) References Cited

U.S. PATENT DOCUMENTS

| | | | |
|---|---|---|---|
| 3,721,000 A | 3/1973 | Okamoto et al. | 29/603.03 |
| 5,006,212 A | 4/1991 | Di Santo et al. | 204/192.14 |
| 5,041,932 A * | 8/1991 | Hamilton | 360/126 |
| 5,113,300 A | 5/1992 | Ikeda et al. | 360/126 |
| 5,141,623 A | 8/1992 | Cohen et al. | 205/122 |
| 5,164,870 A | 11/1992 | Kato et al. | 360/119 |
| 5,198,949 A | 3/1993 | Narisawa et al. | 360/126 |
| 5,247,414 A | 9/1993 | Mitchell et al. | 360/121 |
| 5,559,653 A | 9/1996 | Shouji et al. | 360/126 |
| 5,586,385 A * | 12/1996 | Nishino et al. | 360/126 |
| 5,606,478 A | 2/1997 | Chen et al. | 360/126 |
| 5,621,596 A * | 4/1997 | Santini | 360/126 |
| 5,639,509 A | 6/1997 | Schemmel | 427/130 |
| 5,640,753 A | 6/1997 | Schultz et al. | 29/603.08 |
| 5,659,450 A | 8/1997 | Saito | 360/126 |
| 5,659,451 A | 8/1997 | Cohen et al. | 360/126 |
| 5,675,460 A | 10/1997 | Watanabe et al. | 360/120 |
| 5,703,740 A | 12/1997 | Cohen et al. | 360/126 |
| 5,737,825 A | 4/1998 | Gray et al. | 29/603.14 |
| 5,764,446 A | 6/1998 | Seagle | 360/113 |
| 5,793,578 A | 8/1998 | Heim et al. | 360/126 |
| 5,802,700 A | 9/1998 | Chen et al. | 29/603.14 |
| 5,805,392 A | 9/1998 | Mallary et al. | 360/113 |
| 5,828,533 A | 10/1998 | Ohashi et al. | 360/126 |
| 5,843,521 A | 12/1998 | Ju et al. | 427/129 |
| 5,843,537 A | 12/1998 | Kim et al. | 427/504 |
| 5,853,558 A | 12/1998 | Gray et al. | 205/119 |
| 5,855,056 A | 1/1999 | Cates | 29/603.14 |
| 5,864,450 A | 1/1999 | Chen et al. | 360/113 |

(Continued)

Primary Examiner—George J. Letscher
Assistant Examiner—Christopher R. Magee
(74) Attorney, Agent, or Firm—Joshua C. Harrison, Esq.; Stetina Brunda Garred & Brucker

(57) ABSTRACT

A computer disk drive (22) having a write head (52) which includes a coil (38), a photoresist insulation layer (66) formed on the coil (38), and an insulation shell layer (102) which is formed on the photoresist insulation layer (66). In the first preferred embodiment (100), the top pole (42) of the write head (52) is formed on the insulation shell layer (102).

In the second preferred embodiment (200), the disk drive write gap (76) is formed on the insulation shell layer (102) and the top pole (42) of the write head (52) is formed on the write gap (76).

The insulation shell layers (102) in both embodiments are preferably made of dielectric materials (103).

Methods of fabrication for these embodiments are also disclosed.

11 Claims, 14 Drawing Sheets

U.S. PATENT DOCUMENTS

| | | | |
|---|---|---|---|
| 5,870,262 A | 2/1999 | Ikegawa et al. | 360/126 |
| 5,880,915 A | 3/1999 | Lee et al. | 360/126 |
| 5,890,278 A | 4/1999 | Van Kesteren | 29/603.14 |
| 5,901,432 A | 5/1999 | Armstrong et al. | 29/603.14 |
| 5,935,644 A | 8/1999 | Heim et al. | 427/116 |
| 5,936,813 A | 8/1999 | Kim et al. | 360/113 |
| 5,940,253 A | 8/1999 | Mallary et al. | 360/126 |
| 5,950,301 A | 9/1999 | Gray et al. | 29/603.12 |
| 5,958,544 A | 9/1999 | Usuki | 428/65.3 |
| 6,038,106 A * | 3/2000 | Aboaf et al. | 360/317 |
| 6,150,046 A * | 11/2000 | Watanabe et al. | 360/317 |
| 6,198,608 B1 * | 3/2001 | Hong et al. | 360/325 |

* cited by examiner

| Composition | Substrate | Process | Hk(Oe) | Hth(Oe) | Hoe(Oe) | Easy axis |
|---|---|---|---|---|---|---|
| NFe19 | Directly on I2 | DC | 4.60 | 0.06 | 1.26 | OK |
| | Glass | DC | 3.97 | 0.07 | 1.38 | OK |
| NFe35 | Directly on I2 | DC | 4.87 | 1.13 | 3.20 | OK |
| | Glass | RF | 17.08 | 0.85 | 2.24 | OK |
| NFe45 | Directly on I2 | RF | 23.00 | 1.85 | 10.53 | Rotated 86 deg |
| | Glass | RF | 5.92 | 1.25 | 4.86 | OK |
| NFe55 | Directly on I2 | DC | Isotropic | 14.11 | 18.10 | Isotropic |
| | On I2 with SiO2 shell | DC | 7.11 | 0.77 | 4.45 | OK |
| | Glass | DC | 10.14 | 1.18 | 7.62 | OK |
| | Directly on I2 | RF | 11.71 | 2.16 | 11.32 | OK |
| | On I2 with SiO2 shell | RF | 9.37 | 1.10 | 7.10 | OK |
| | Glass | RF | 10.4 | 0.86 | 6.88 | OK |

FIGURE 7

INSULATION LAYER STRUCTURE FOR INDUCTIVE WRITE HEADS AND METHOD OF FABRICATION

TECHNICAL FIELD

The present invention relates generally to inductive write heads used in magnetic media storage devices, and more particularly to magneto-resistive disk drive heads.

BACKGROUND ART

An inductive write head consists of top and bottom magnetic poles and multi-turn coils to drive the field. The coils are encapsulated in usually one or two insulation layers, which are conventionally made of cured photoresist. A write gap between the top and bottom magnetic poles is typically of dielectric material, and is usually deposited prior to the insulation layer. The seed layer for plating the second writer pole (P2) is deposited using PVD process, such as sputter deposition. By this approach, some portion of the seed layer is on the cured photoresist insulation. The P2 layer is then electroplated into photoresist patterns to form the top pole structure. Experimental results suggest that magnetic films such as seed layers, which are typically NiFe films with different Fe contents, or other types of high moment magnetic films such as FeXN (X=Al, Ta, Rh, etc), exhibit poor magnetic properties when sputter deposited onto cured photoresist. This can be attributed to the significant difference in thermal mechanical properties between photoresist and magnetic films, as well as poor grain growth of the magnetic films on photoresist surface.

Also seed removal of the thick sputtered film requires a great amount of over milling into the insulation stack. The photoresist material has a relatively high milling rate and tends to become conductive at the milled surface. Therefore, the integrity of the insulation can be compromised during this process, and the coil may be damaged.

Thus there is a need for a new fabrication layer which can improve adhesion of magnetic films to the insulation layer, improve grain growth of pole seed layers, decrease the differential in thermal mechanical properties between the insulation layer and magnetic film layers, protect the coil from damage during ion milling processes, and preserve the desirable magnetic anisotropy properties of high moment magnetic films during fabrication.

SUMMARY OF THE INVENTION

A disk drive write head having an insulation layer structure, which is made of cured photoresist encapsulated in a thin insulation shell layer, preferably of dielectric material. In a second embodiment, the write gap, which is typically $Al_2O_3$, AlON, or $SiO_2$, SiN, etc, can subsequently be deposited onto this insulation structure, which has excellent smoothness and adhesion. Magnetic films of NiFe and FeXN can be deposited directly onto the write gap material. Much improved magnetic properties and better film adhesion are achieved in these films when deposited on dielectric films instead of cured photoresist resin. Another important advantage of the insulation stack described here is its ability to withstand extensive ion milling during the removal of the seed layer or other thicker sputtered magnetic layer after the top pole structure is defined. This insulation structure can also prevent the insulation from cracking during the subsequent wafer processes. The gap-on-insulation structure also greatly improves the write gap thickness control.

For a fuller understanding of the nature and advantages of the present invention, reference should be made to the following detailed description taken together with the accompanying figures.

DISCLOSURE OF INVENTION

Accordingly, it is an object of the present invention to provide an insulation shell, preferably of a dielectric material such as silicon oxide or aluminum oxide shell on cured photoresist, which protects desirable magnetic anisotropy properties of higher Fe content NiFe films.

A further object of the present invention is to improve the adhesion of magnetic film material to the insulation layer by providing an insulation shell, which is very smooth and has good adhesion to cured photoresist.

Another object of the present invention is to provide a protective layer on the cured photoresist insulation.

Yet another object of the present invention is to provide an insulation shell layer which allows write gap material to be deposited on top of insulation.

Still another object of the present invention is improve the magnetic properties of material sputter deposited by decreasing the difference in thermal mechanical properties between the insulation layer and magnetic film layers, and improving grain growth of the magnetic films on the insulation layer surface.

Briefly, one preferred embodiment of the present invention is a computer disk drive write head which includes a coil, a photoresist insulation layer on the coil, and an insulation shell layer which is formed on the photoresist insulation layer. In the first preferred embodiment, the top pole of the write head is then formed on this insulation shell layer.

A second preferred embodiment of the present invention is a computer disk drive having a write head which includes a coil, a photoresist insulation layer on the coil, and an insulation shell layer which is formed on the photoresist insulation layer. In the second preferred embodiment, the write gap is then formed on the insulation shell layer and the top pole of the write head is formed on the write gap.

Methods of fabrication for these embodiments are also disclosed.

An advantage of the present invention is the insulation shell layer is less susceptible to cracking.

Another advantage of the invention is the insulation shell layer protects the coil during the extensive ion milling process to remove the seed or thicker sputtered high Bs films.

And another advantage of the invention is that an insulation shell layer greatly improves the magnetic film properties deposited on top, compared to those deposited on photoresist.

A further advantage of the invention is that the thickness of the write gap can be better controlled when it is on top of insulation, especially when $Al_2O_3$ gap material is used.

These and other objects and advantages of the present invention will become clear to those skilled in the art in view of the description of the best presently known mode of carrying out the invention and the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 7 illustrates a table of magnetic properties of layered materials, including two examples with include the insulation shell layer of the present invention, these examples being emphasized by dark bordered boxes;

BEST MODE FOR CARRYING OUT THE INVENTION

Figure 1:
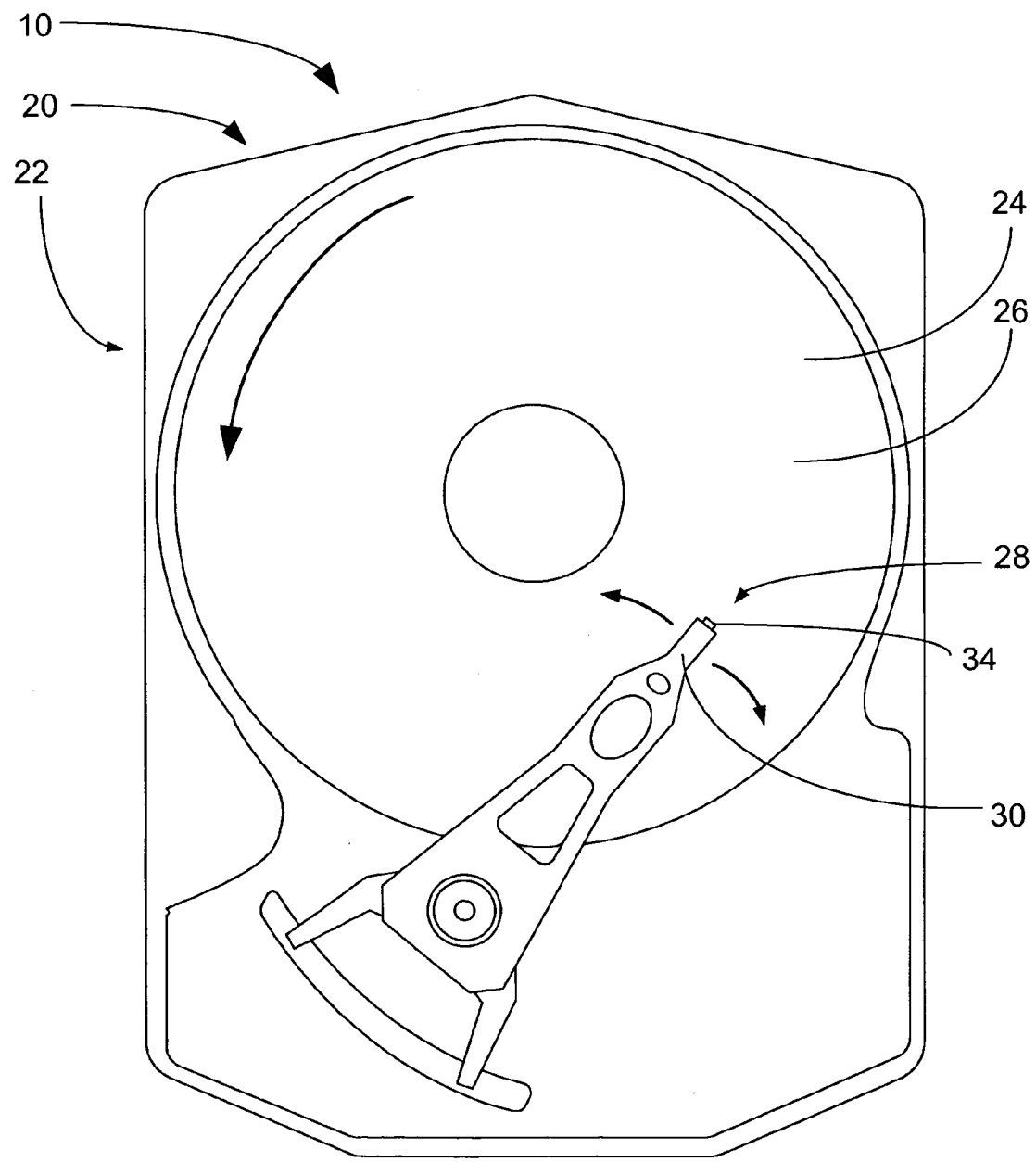
FIG. 1 shows a simplified top plan view of a disk drive.

A preferred embodiment of the present invention is a disk drive having an added insulation shell layer. As illustrated in the various drawings herein, a form of this preferred embodiment of the inventive device is depicted by the general reference character 10.

FIG. 1 shows a simplified top plan view of a magnetic storage device 20, in this case a hard disk drive 22, which generally includes a magnetic storage medium 24, specifically a hard disk 26. A data read/write device 28 is included on an arm 30, which supports a slider 34.

Figure 2:
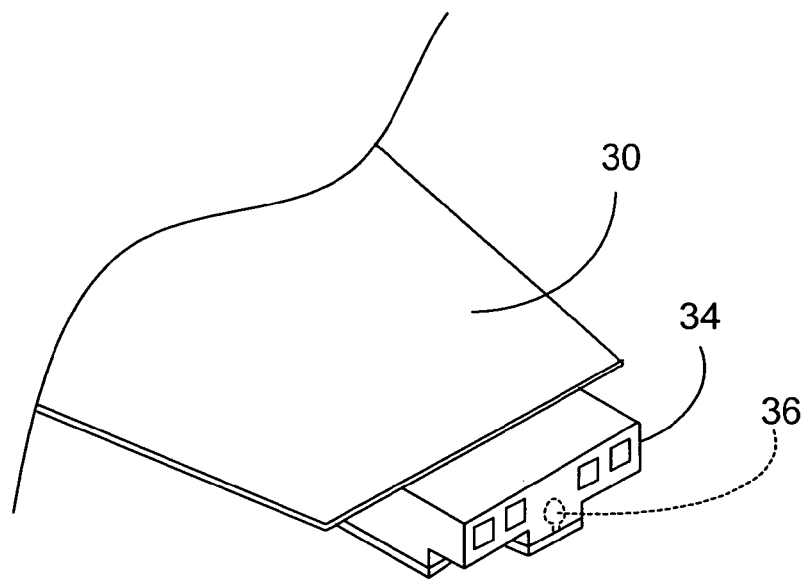
FIG. 2 shows an isometric detail view of the slider of a disk drive.

FIG. 2 illustrates a simplified isometric detail view of the slider 34 into which a magneto-resistive head 36 has been embedded.

Figure 3:
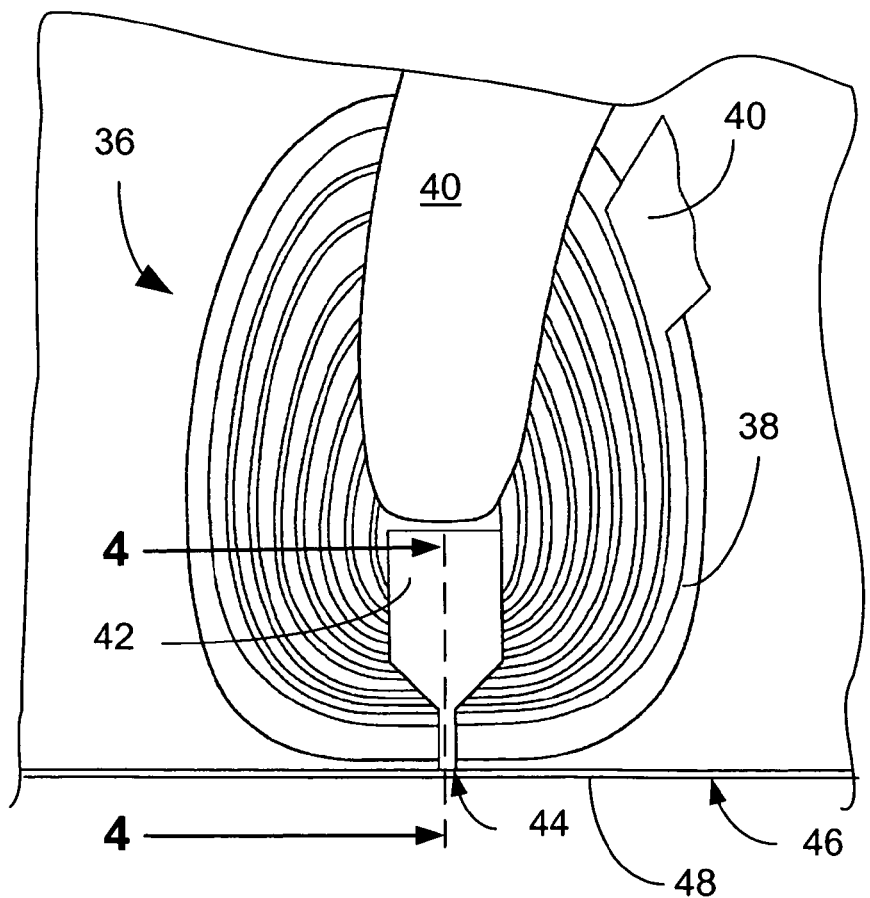
FIG. 3 illustrates a top plan view of a magneto-resistive read/write head.

FIG. 3 shows a top plan view of the components of the magneto-resistive head 36, including a coil 38, leads 40, a top pole piece 42 having a pole tip 44. The surface facing the disk 26 (see FIG. 1) is supported by a layer of air which is established due to the rotation of the disk 26 under the slider 34, and which is known as the Air Bearing Surface or ABS 46. This ABS is covered with a protective coating 48.

Figure 4:
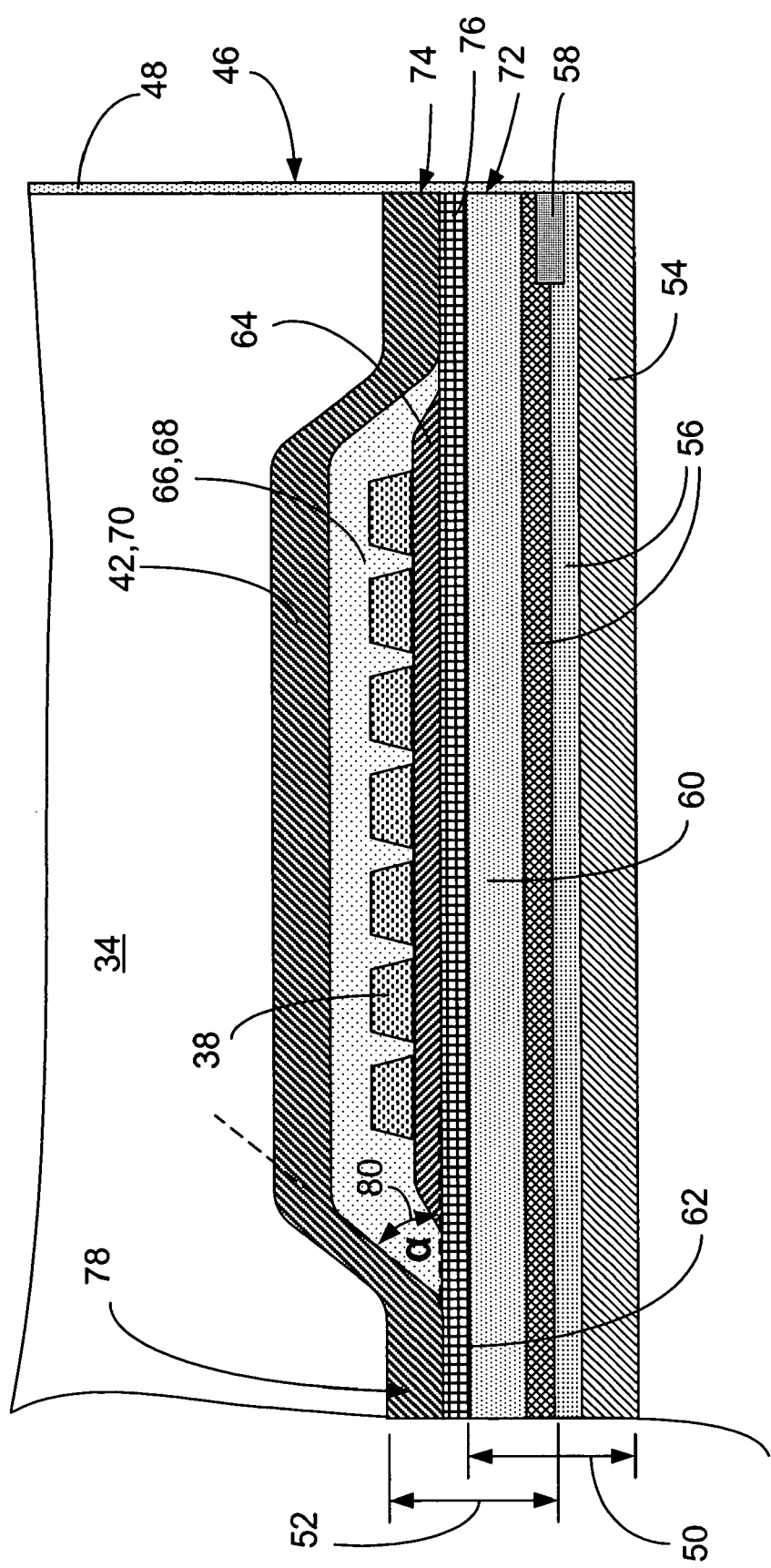
FIG. 4 shows a partial cross sectional view from line 4—4 of FIG. 3, which has been turned to a horizontal orientation, of the magneto-resistive read/write head, showing the standard features used in the prior art.
Figure 5:
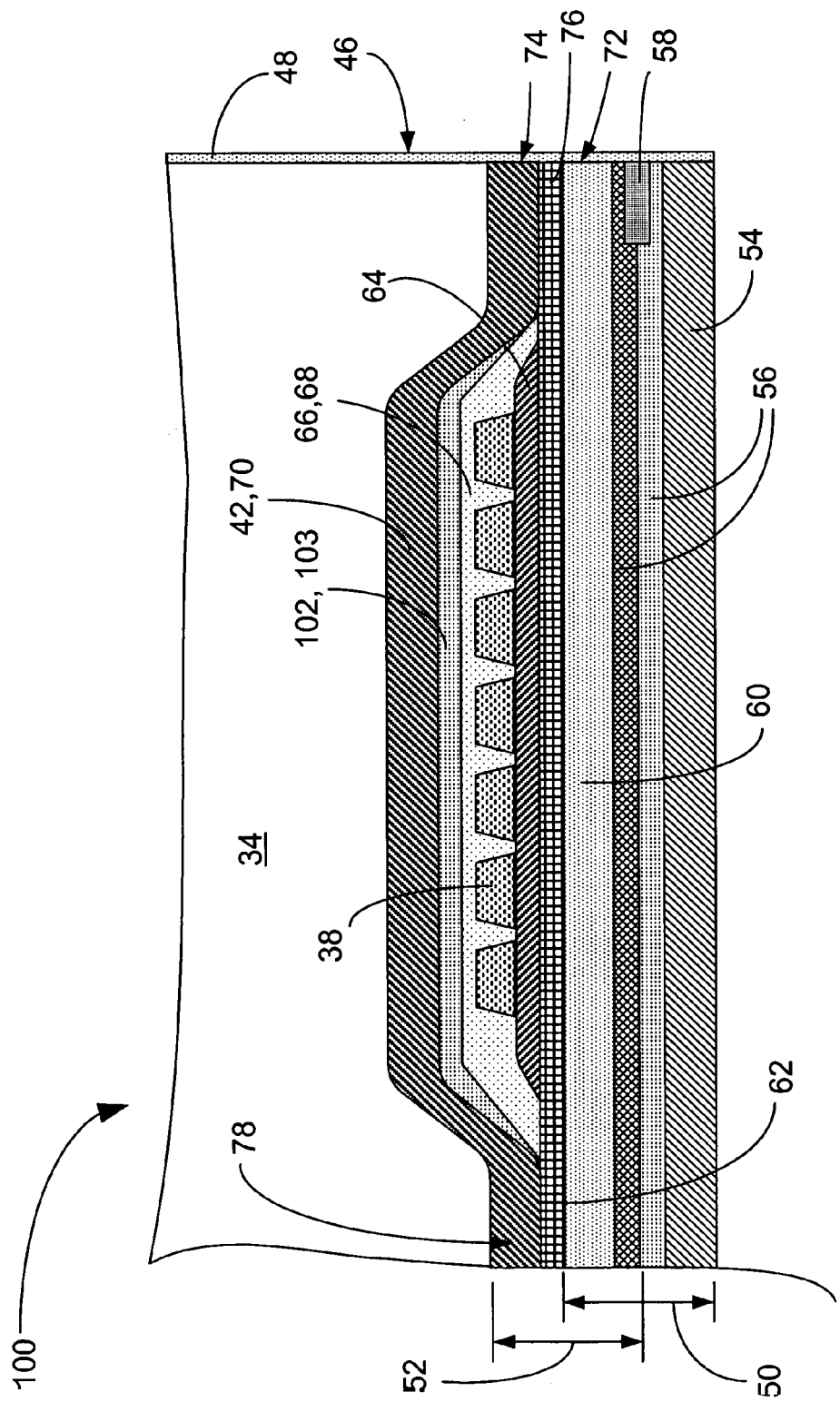
FIG. 5 illustrates a partial cross sectional view from line 4—4 of FIG. 3, which has been turned to a horizontal orientation, of the magneto-resistive read/write head, showing a first embodiment of the present invention.
Figure 6:
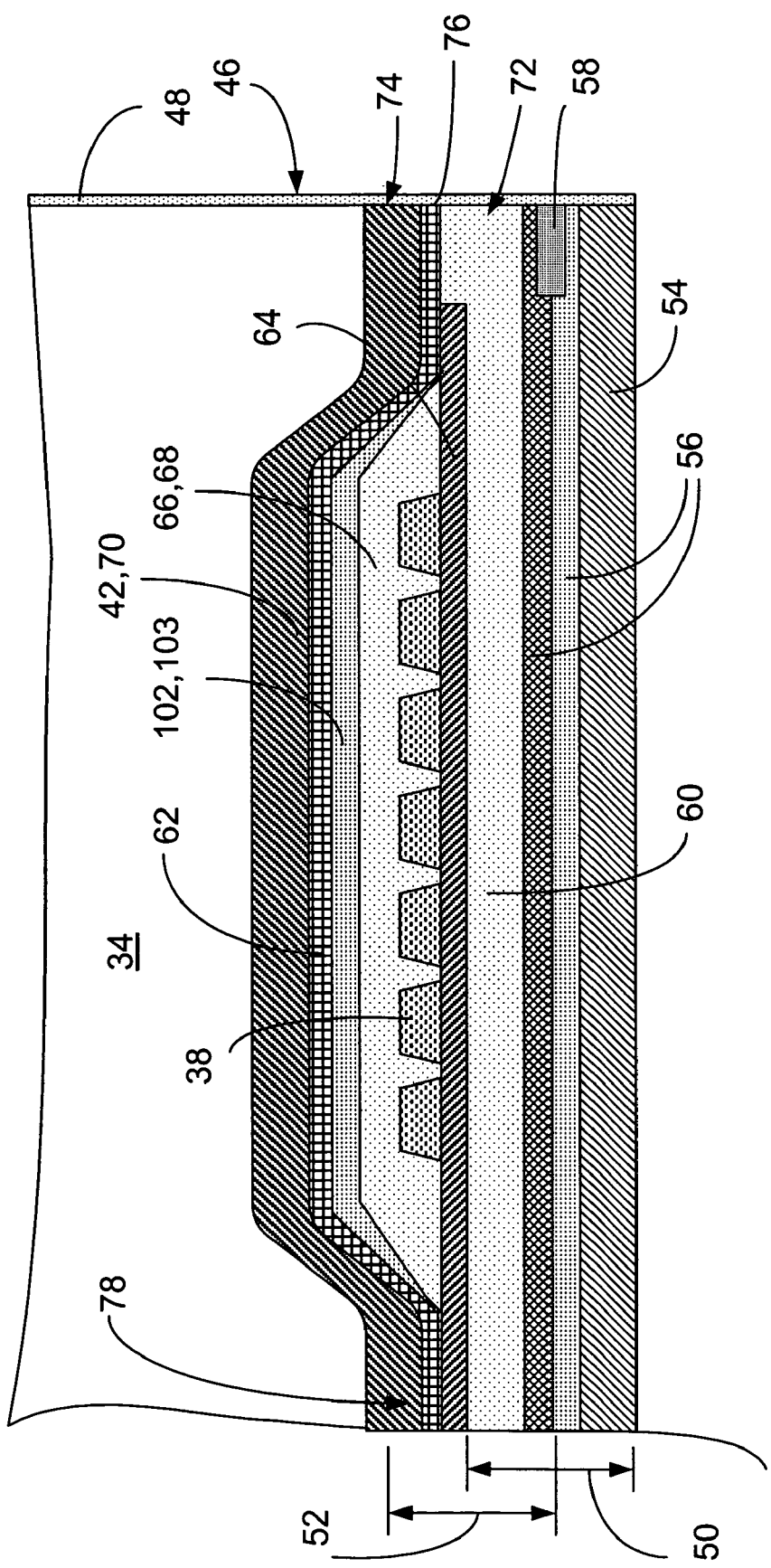
FIG. 6 shows a partial cross sectional view from line 4—4 of FIG. 3, which has been turned to a horizontal orientation, of the magneto-resistive read/write head, showing a second embodiment of the present invention.

FIGS. 4–6 are cross-sectional views taken through line 4—4 in FIG. 3, which are turned to a horizontal orientation. FIG. 4 shows the prior art for comparison, and FIGS. 5 and 6 show first and second embodiments of the present invention. Certain elements are common to both the prior art and both embodiments of the present invention, and where these are similar, the same reference numbers will be used, in all three figures. In this type of magneto-resistive head, both the read head 50 and the write head 52 are included on the same device, but it will be understood that the present invention is useful for devices in which the read head is separate from the write head.

The prior art, as seen in FIG. 4, will be described first. Layers are generally deposited upon one another and generally include a shield layer 54, a dual gap layer 56, which surround a Magneto-resistive sensor, called MR sensor 58, a pole piece layer, which will be referred to as the first pole or P1 60, a non-magnetic gap layer 62, a first insulation layer 64, upon which the coils 38 lie, and a second insulation layer, usually referred to as I2 66. This I2 66 is generally made from photo-resist material 68. The pole piece 42 previously seen in FIG. 3 is next, and will be referred to as the second pole or P2 70. The first and second poles 60, 70 each have first and second pole tips 72, 74 respectively with pole gap 76 between them. The ABS 46 and the coating layer 48 are also shown, as well as a back gap 78. The angle that the insulation layer 66 makes with the non-magnetic gap layer 62 is called the apex angle α 80.

The first embodiment 100 of the present invention 10 is shown in FIG. 5. A third insulation layer, which is a insulation shell layer 102, is shown to be formed on top of the I2 layer 66. This insulation shell layer 102 is included for the several reasons. There are several problems and limitations related to the use of cured photoresist, conventionally used as the insulation layer I2 66, which the use of a insulation shell layer 102 can correct.

The second pole layer, P2 70, is typically formed by depositing a seed layer as the first step in forming the P2 pole 70. The magnetic properties of NiFe seed layer and high moment FeXN films tend to deteriorate when deposited onto cured photoresist 68. The data shown in the table of FIG. 7 suggest that when higher Fe content NiFe films are deposited onto substrates coated with cured photoresist, the =coercivity values increase and the desirable magnetic anisotropy properties are lost, as can be seen by the values of Hch, the coercivity value in the hard axis direction, and Hce, the coercivity value in the easy axis direction. In fact, NiFe55% seed layer became magnetically isotropic; whereas the easy axis of NiFe45% seed was rotated nearly 90 degree. The increase in hard axis coercivity values of the high Fe content seed films also suggested degradation in easy axis alignment. As FIG. 7 shows, the magnetic properties of the lower Fe content films (Fe of 18, 35%) are not affected very much by depositing onto photoresist 12. High Fe content (45, 55% Fe) films are significantly affected. By inserting a $SiO_2$ dielectric layer, the soft magnetic properties are basically restored to be similar to the films deposited onto glass substrate.

Two examples are listed which include the insulation shell layer of the present invention using dielectric material, these examples being emphasized by dark bordered boxes and arrows. It can be seen that the magnetic properties Hch and Hce of the seed layer can be much improved by depositing onto an $Al_2O_3$ underlayer or by inserting a $SiO_2$ interlayer between cured photoresist and sputtered magnetic films.

A second problem is that the insulation made of cured photoresist 68 is prone to cracking. It can be partially attributed to the significant difference in thermal expansion coefficient between the photoresist resin and metallic films. During the deposition of NiFe seed layer or other high Bs films, substrate heating is often used to obtain desirable magnetic properties. However, mechanical tension can be induced when the films are deposited at elevated temperatures and then cooled to room temperature. The intrinsic high stress in the electroplated films may also cause insulation to crack. This effect is decreased by using an insulation shell layer 102, preferably made of dielectric material 103, which has thermal expansion properties closer to those of the metallic films.

Figure 8:
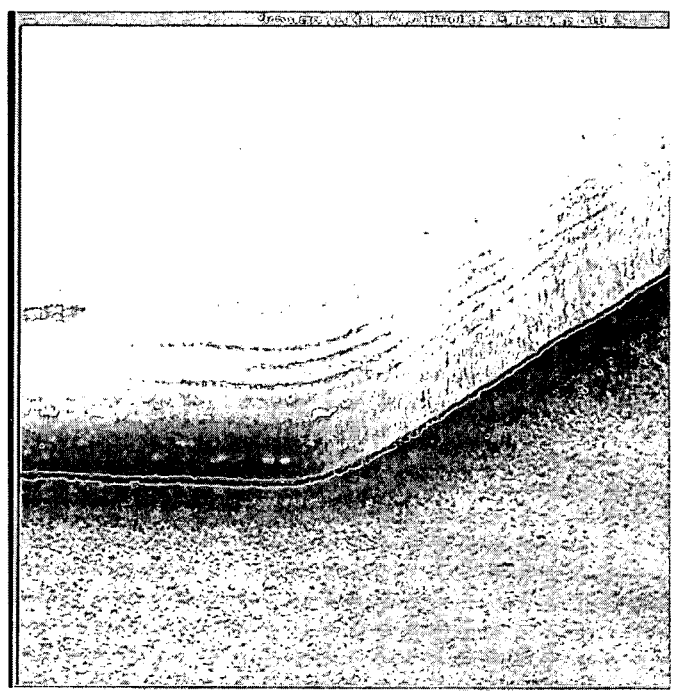
FIG. 8 shows an electron micrograph of an insulation stack.
Figure 9:
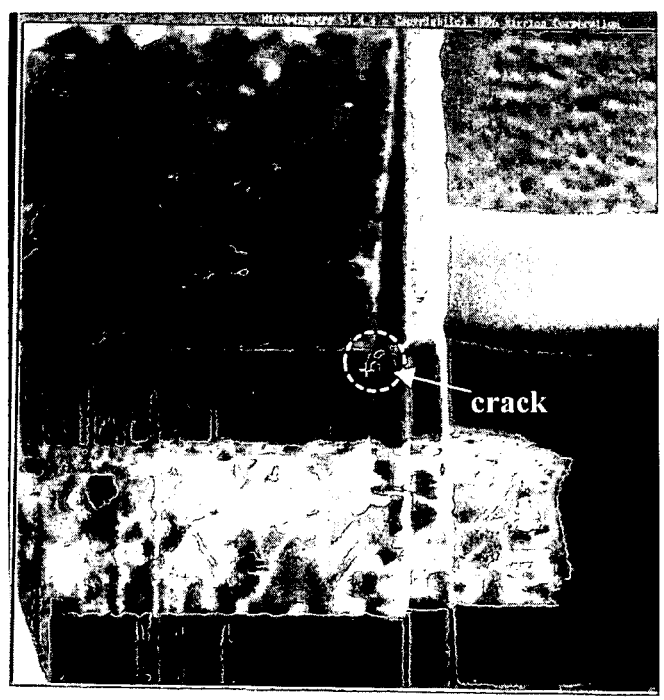
FIG. 9 illustrates an electron micrograph of an insulation stack, showing micro-sized cracks which occur during ion milling operations.

Moreover, the ion milling process used for removing the seed layer can also roughen or induce micro-sized cracks in the insulation, as shown in FIGS. 8 and 9.

Returning to FIG. 4, the I2 insulation layer 66 is usually kept sufficiently thin in order to reduce the apex angle 80, and therefore may fail to give adequate protection for the coils 38 against extensive ion milling or other wafer processes. Recently, sputter deposited FeXN high Bs films are being incorporated as a thick seed layer at the bottom portion of the second pole 74. The sputtered high Bs films have Bs more than 20 kG and desirable magnetic properties to significantly enhance the writer performance. However, the seed removal of the thick sputtered film requires a great amount of over milling into the insulation stack. The photoresist material 68 has a relatively high milling rate and tends to become conductive at the milled surface. Therefore, the integrity of the I2 insulation 66 can be compromised during this process. In contrast, an insulation shell layer 102 from dielectric materials has a much lower milling rate, and can therefore protect both the I2 layer 66 and the coils 38 from damage.

Figure 10:
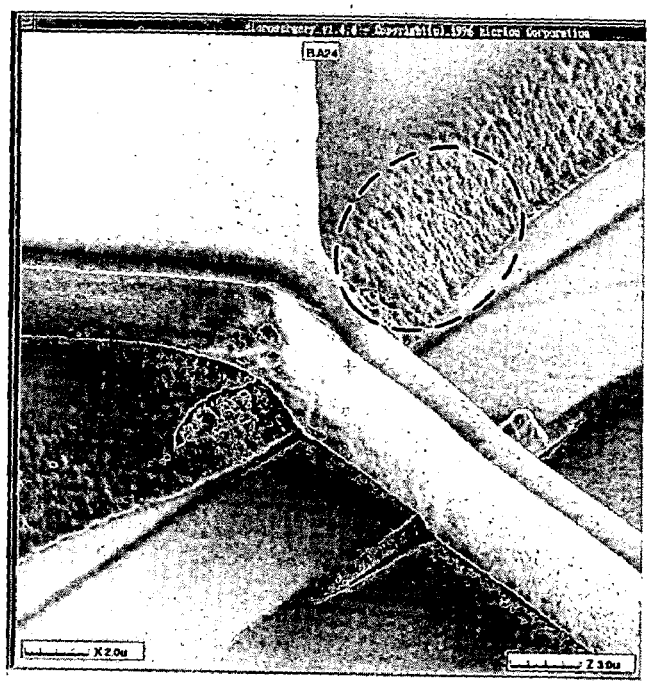
FIG. 10 illustrates an electron micrograph showing a rough surface which results when deposition of magnetic materials is attempted directly onto photoresist.

Another problem is that the adhesion of the deposited magnetic film to the cured photoresist interface is generally not as strong as that to the dielectric films such as $Al_2O_3$. The image shown in FIG. 10 indicates rough film surface of sputtered deposited 5000 A of FeRhN/CoZrCr laminated film, when it is deposited directly onto photoresist insulation, especially on the sloping surface.

In contrast, by depositing the insulation shell layer 102 of dielectric material, the smoothness of the surface is much improved.

The insulation shell layer 102 can be formed by a variety of processes, including, but not limited to Physical Vapor Deposition (PVD), including sputter deposition and ion beam deposition, and Chemical Vapor Deposition (CVD) including plasma enhanced Chemical Vapor Deposition (PECVD), Low Pressure Chemical Vapor Deposition (LPCVD) and Atomic Layer Chemical Vapor Deposition (ALCVD). The insulation shell layer 102 can be formed from a number of materials, preferably dielectric materials, including, but not limited to $Al_2O_3$, AlN, AlON, $SiO_2$, $Si_3N_4$, SiON, $Ta_2O_5$, and $HfO_2$.

Referring now to FIGS. 4 and 6, another way of overcoming the above-mentioned problems is to deposit the non-magnetic write gap layer 62 onto cured photoresist insulation 68. The write gap materials such as $Al_2O_3$ or ALON have low ion milling rates and can act as protective layer for the photoresist insulation 68. Additionally, the thickness of the write gap 76 can be better controlled because of the reduction in process steps between the deposition of the gap layer 76 and seed layer of the second pole layer 70. In comparison, if the write gap 76 is placed under the coil 38 and insulation 64, the alumina gap 76 thickness is reduced in certain photolithography steps during which the gap 76 is etched by photo developer. The overmilling of the coil 38 seed layer can also decrease the gap 76 thickness.

Figure 11:
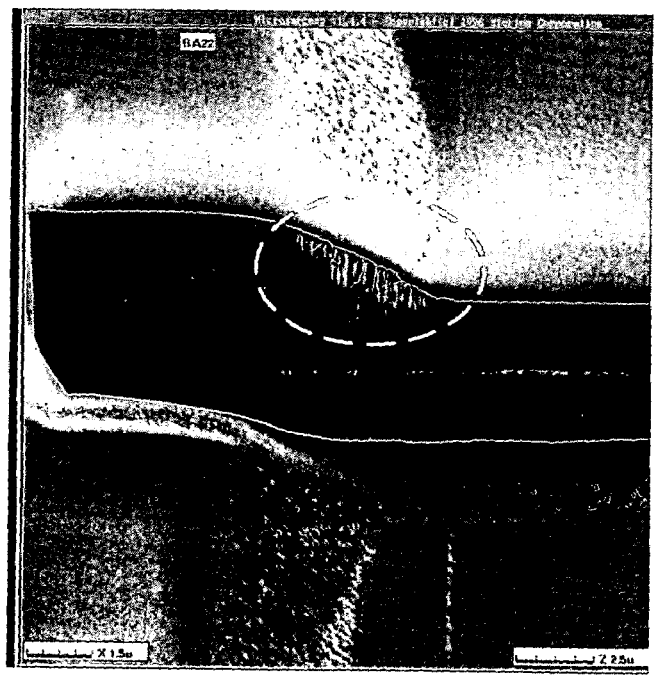
FIG. 11 illustrates an electron micrograph showing cracks in photoresist material caused when "supergap" material is deposited onto the photoresist.

However, it proves to be a difficult task to deposit $Al_2O_3$ or ALON ("supergap") write gaps 76 directly on cured photoresist 68. Deposited $Al_2O_3$ using a reactive sputtering technique (in $Ar/O_2$ gas) exhibited unacceptable roughness on cured photoresist 68. On the other hand, the "supergap" deposition process (in $Ar/O_2N_2$ gas) itself caused severe cracking in photoresist insulation 68 as seen in the circled area in FIG. 11. It was found that the "supergap" deposition process uses high substrate bias, which resulted in a net removal of materials on the sloped region of the insulation. $Al_2O_3$ gaps deposited using ion beam deposition (IBD) or rf sputtering process were found to be acceptable. The gap 76 of silicon oxide can be deposited on cured photoresist 68 using a CVD (chemical vapor deposition) process. Although the silica gap 76 is very smooth, it shows lack of good adhesion to the subsequently deposited magnetic films. Silica also has a high milling rate and may not provide adequate protection for the insulation.

Figure 12:
FIG. 12 illustrates an electron micrograph showing a $SiO_2$ layer covered by a photoresist mask deposited on top of the I2 layer.
Figure 13:
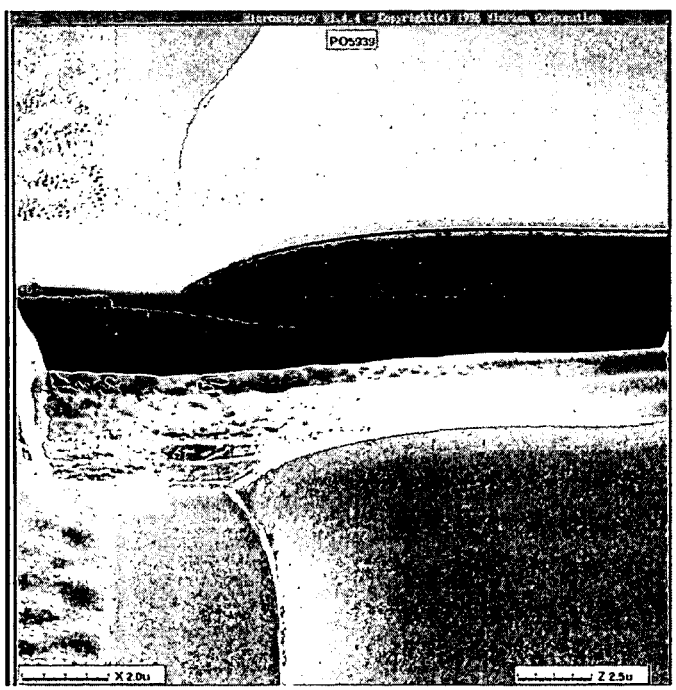
FIG. 13 illustrates an electron micrograph showing a $SiO_2$ layer deposited on top of the I2 layer.

In order to overcome these problems, a second preferred embodiment 200 of the present invention may be used, as seen in FIG. 6. An insulation shell layer 102 preferably of dielectric material 103, also called an I2 shell, is first fabricated. This is achieved by first depositing a layer of dielectric material after the photo-resist 68 of the I2 insulation layer 66 is cured. A photoresist pattern, which is the same as or similar to the I2 pattern, is then lithographically produced, as seen in FIG. 12. The insulation shell layer 102, which is not covered by the photoresist mask, is then removed, in the case of silica, by a reactive ion etching (RIE) technique; whereas in the case of alumina, by ion mill or reactive ion beam etching (RIBE). The photoresist mask is then stripped and the write gap 76 is deposited (see FIG. 13). The write gap 76 materials may include $Al_2O_3$, ALON, or $SiO_2$, etc. The deposition techniques for fabricating these write gaps may include reactive or nonreactive rf or dc sputtering, ion beam deposition, or CVD (chemical vapor deposition) process.

Although silica, SiO2, may be used as the I2 shell layer 102, it may be preferred that some other dielectric material be used for the write gap material, due to the previously mentioned adhesion difficulties with magnetic film materials. If the gap material and the I2 shell 102 material are to both be made of silica, it is also preferred that the I2 shell 102 be patterned are removed before the deposition of the gap layer 76, as the insulation shell layer 102 is preferably thicker than the gap layer 76.

Figure 14:
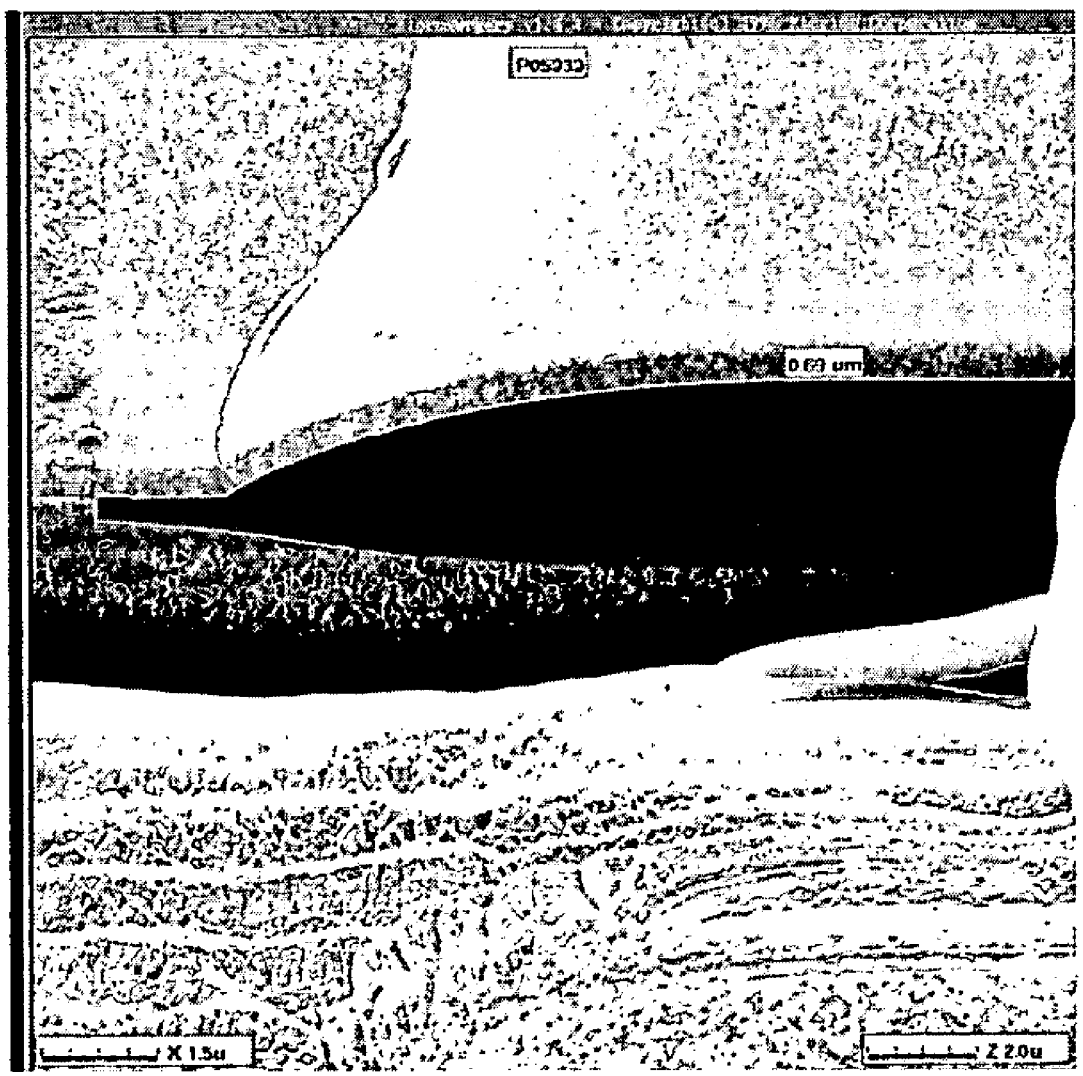
FIG. 14 illustrates an electron micrograph showing a $SiO_2$ layer onto which a write gap layer and a high Bs layer have been deposited.

As shown in FIG. 14, after the I2 shell and write gap deposition, a 5000 A thick FeRhN/CoZrCr laminated film is sputter deposited.

As mentioned above, and as will be obvious to one skilled in the art, both embodiments of the present invention 100, 200 are useful for disk drives having write heads and read heads in a combined read/write head and for those having separate read and write heads.

Figure 15:
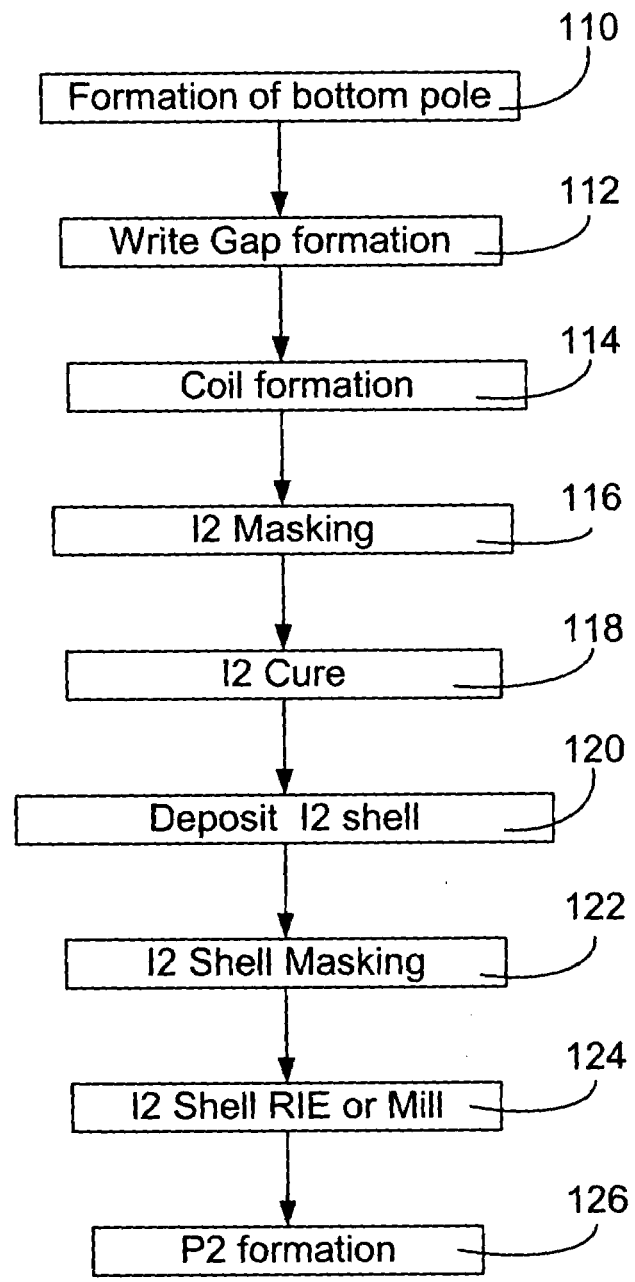
FIG. 15 shows a simplified flow chart of the steps involved in fabrication of the first embodiment of the present invention.

The process flow of the wafer fabrication process is schematically shown in FIGS. 15–18. FIG. 15 shows a simplified flowchart of the steps involved in fabrication of the first embodiment 100 of the present invention, in which the insulation shell layer is deposited onto the I2 layer.

The basic steps are formation of the bottom pole, P1 110, write gap formation 112, coil formation 114, deposition and masking of I2 photoresist layer 116, curing of the I2 photoresist layer 118, deposition of insulation shell layer, (I2 shell) 120, masking the I2 shell 122, reactive ion etching or ion milling of I2 shell 124, and the formation of the top pole, P2 126.

Figure 16:
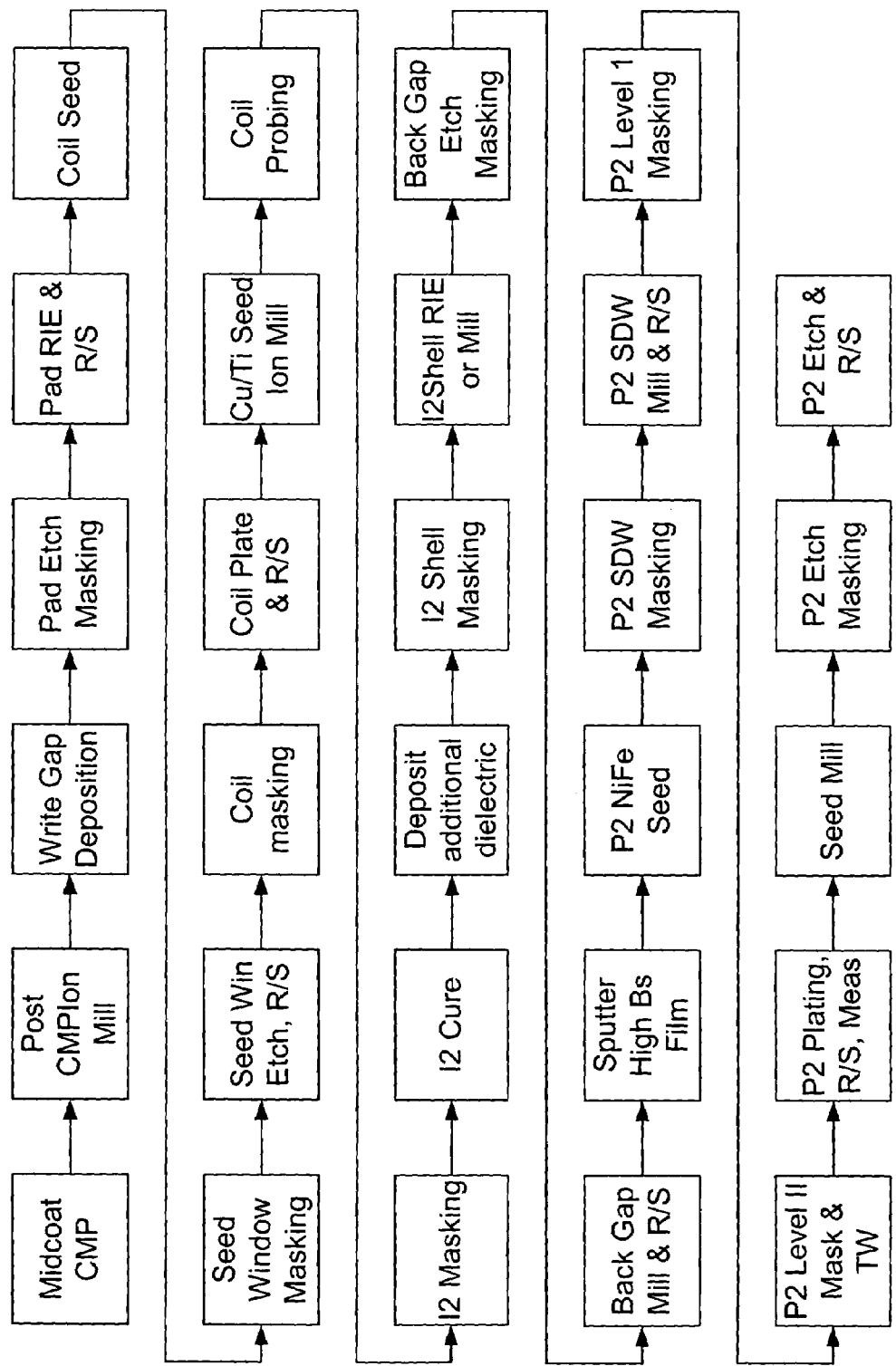
FIG. 16 shows a detailed flow chart of the steps involved in fabrication of the first embodiment of the present invention.

FIG. 16 shows the steps of this process in more detail.

Figure 17:
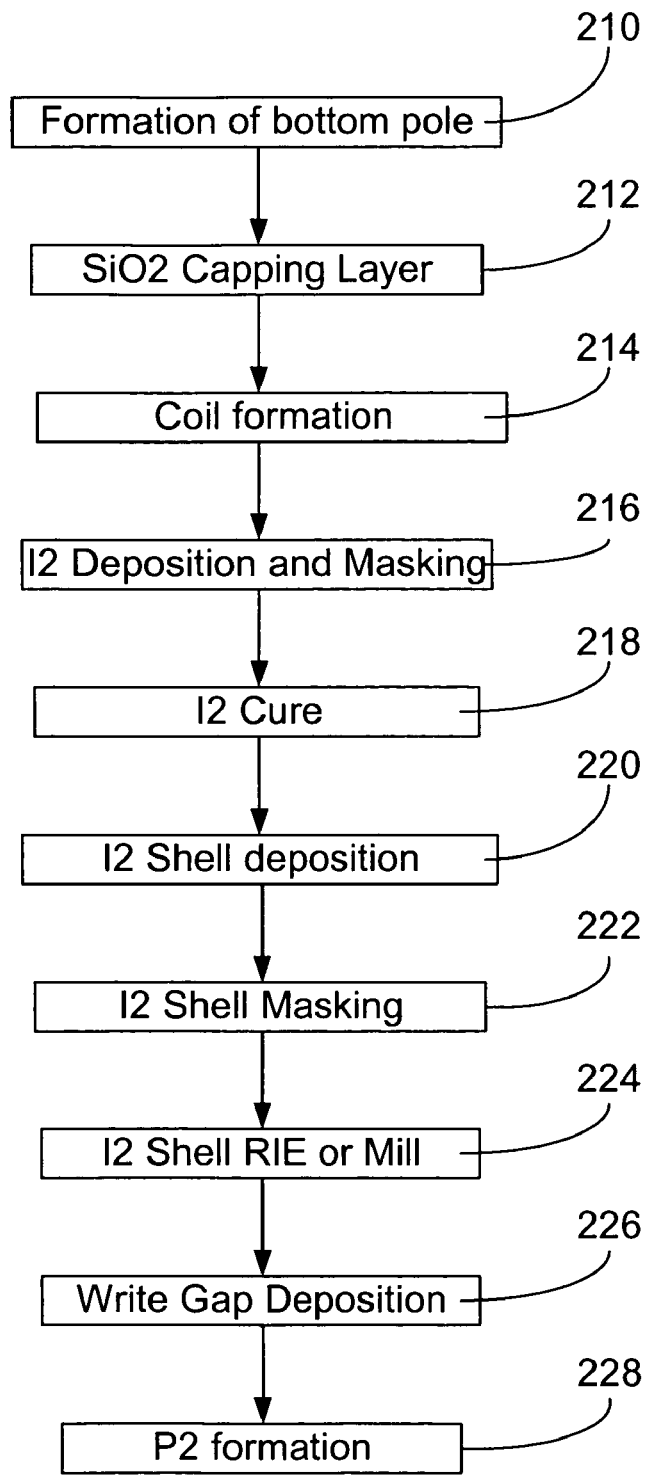
FIG. 17 shows a simplified flow chart of the steps involved in fabrication of the second embodiment of the present invention.

FIG. 17 shows a simplified flowchart of the steps involved in fabrication of the second embodiment 200 of the present invention, in which the insulation shell layer, as an I2 shell, is deposited on the I2 insulation layer before the write gap material is deposited on the I2 shell material.

The basic steps are formation of the bottom pole, P1 210, formation of an SiO2 capping layer 212, coil formation 214, deposition and masking of I2 photoresist layer 216, curing of the I2 photoresist layer 218, deposition of insulation shell layer, (I2 shell) 220, masking the I2 shell 222, reactive ion etching or ion milling of I2 shell 224, write gap formation 226 and the formation of the top pole, P2 228.

Figure 18:
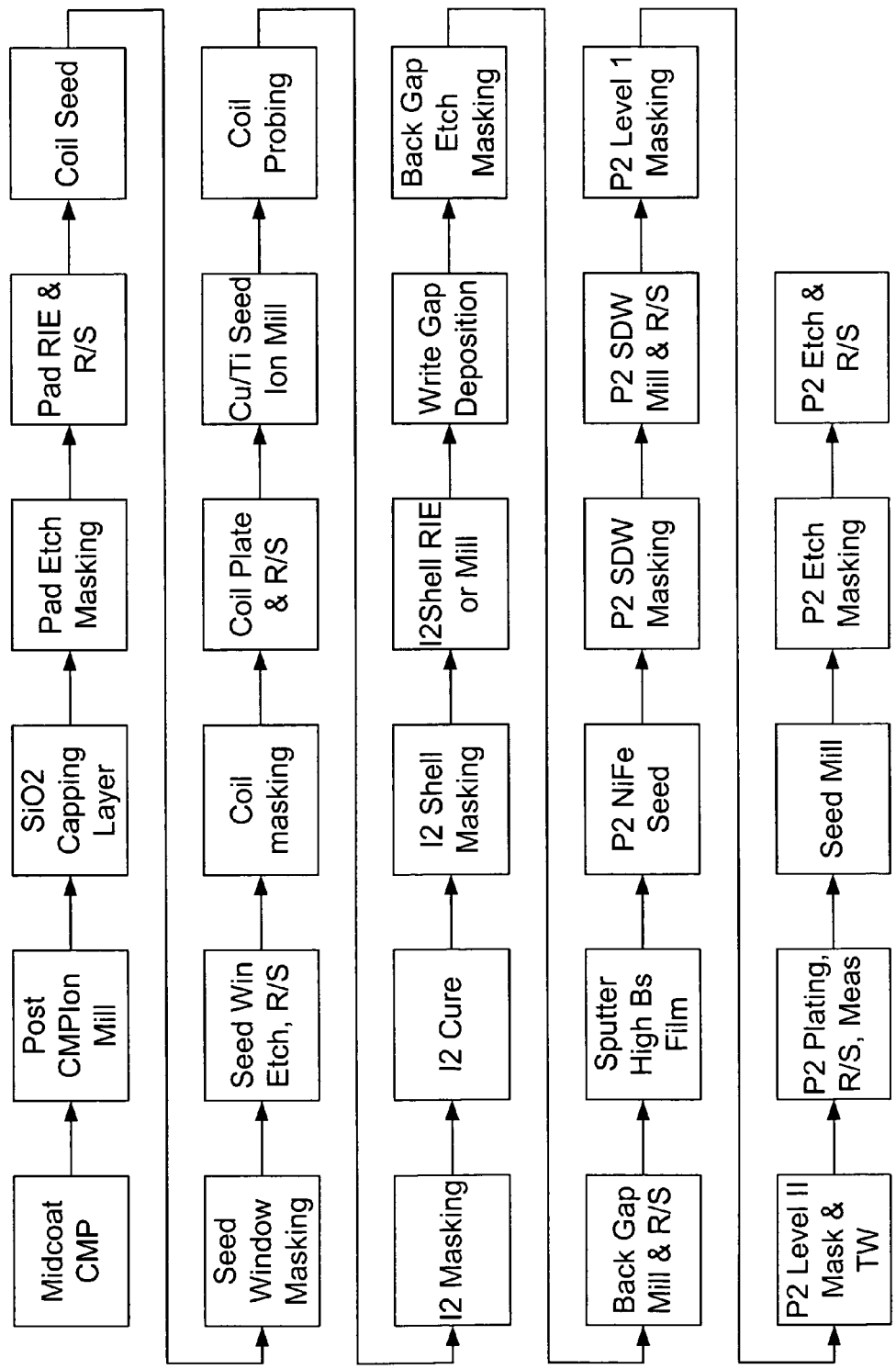
FIG. 18 shows a simplified flow chart of the steps involved in fabrication of the second embodiment of the present invention.

FIG. 18 illustrates the steps of this process in more detail.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A disk drive write head comprising:
   a bottom pole;
   a write gap layer on said bottom pole;
   a coil on said write gap layer;
   a photoresist insulation layer on said coil;
   an insulation shell layer on the entire photoresist insulation layer, said insulation shell layer conforming to the contours of said photoresist insulation layer, the insulation shell layer being formed of a dielectric material having a lower milling rate than a milling rate of the photoresist insulation layer; and
   a top pole on said insulation shell layer, the top pole having an apex angle substantially defined by the photoresist insulation layer.

2. The disk drive write head as recited in claim 1, wherein:
   said insulation shell layer is formed by a process chosen from the group consisting of Physical Vapor Deposition (PVD), sputter deposition, ion beam deposition, Chemical Vapor Deposition (CVD), plasma enhanced Chemical Vapor Deposition (PECVD), Low Pressure Chemical Vapor Deposition (LPCVD) and Atomic Layer Chemical Vapor Deposition (ALCVD).

3. The disk drive head as recited in claim 1, wherein:
   said insulation shell layer is formed from materials chosen from the group consisting of dielectric materials, $Al_2O_3$, AlN, AlON, $SiO_2$, $Si_3N_4$, SiON, $Ta_2O_5$, and $HfO_2$.

4. The disk drive write head as recited in claim 1, wherein:
   said disk drive write head includes a read head.

5. A disk drive write head comprising:
   a bottom pole;
   a first insulation layer on said bottom pole;
   a coil on said first insulation layer;
   a photoresist insulation layer on said coil;
   an insulation shell layer on the entire photoresist insulation layer, said insulation shell layer conforming to the contours of said photoresist insulation layer, the insulation shell layer being formed of a dielectric material having a lower milling rate than a milling rate of the photoresist insulation layer;
   a write gap on said insulation shell layer; and
   a top pole on said write gap layer, the top pole having an apex angle substantially defined by the photoresist insulation layer.

6. The disk drive write head as recited in claim 5, wherein:
   said insulation shell layer is formed by a process chosen from the group consisting of Physical Vapor Deposition (PVD), sputter deposition, ion beam deposition, Chemical Vapor Deposition (CVD), plasma enhanced Chemical Vapor Deposition (PECVD), Low Pressure Chemical Vapor Deposition (LPCVD) and Atomic Layer Chemical Vapor Deposition (ALCVD).

7. The disk drive write head as recited in claim 5, wherein:
   said insulation shell layer is formed from materials chosen from the group consisting of dielectric materials, $Al_2O_3$, AlN, AlON, $SiO_2$, $Si_3N_4$, SiON, $Ta_2O_5$, and $HfO_2$.

8. The disk drive write head as recited in claim 5, wherein:
   said disk drive write head includes a read head.

9. A computer disk drive having a write head which includes a top pole, a coil and a photoresist insulation layer on the coil, comprising:
   an insulation shell layer on the entire photoresist insulation layer, said insulation shell layer conforming to the contours of said photoresist insulation layer, the insulation shell layer being formed of a dielectric material having a lower milling rate than a milling rate of the photoresist insulation layer, the photoresist insulation layer substantially defining an apex angle of the top pole.

10. A computer disk drive as recited in claim 9, further comprising:
    a top pole which is formed on said insulation shell layer.

11. A computer disk drive as recited in claim 9, further comprising:
    a write gap on said insulation shell layer; and
    a top pole on said write gap layer.

* * * * *